US007760643B2

(12) United States Patent
Kim et al.

(10) Patent No.: US 7,760,643 B2
(45) Date of Patent: Jul. 20, 2010

(54) AUTOMATIC POLICY CHANGE MANAGEMENT SCHEME FOR DIFFSERV-ENABLED MPLS NETWORKS

(75) Inventors: Gi Tae Kim, Morristown, NJ (US); George Lapiotis, Morristown, NJ (US); Narayanan Natarajan, Marlboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 487 days.

(21) Appl. No.: 11/784,649

(22) Filed: Apr. 9, 2007

(65) Prior Publication Data

US 2008/0247314 A1 Oct. 9, 2008

(51) Int. Cl.
*H04L 12/26* (2006.01)
*H04L 12/66* (2006.01)
(52) U.S. Cl. .................. 370/235; 370/229; 455/452.1; 455/453
(58) Field of Classification Search .......... 370/229, 370/235; 455/452.1–453
See application file for complete search history.

(56) References Cited

U.S. PATENT DOCUMENTS

| 6,490,249 | B1 * | 12/2002 | Aboul-Magd et al. | 370/232 |
| 7,092,356 | B2 * | 8/2006 | Rabie et al. | 370/230 |
| 2005/0160171 | A1 | 7/2005 | Rabie et al. | |
| 2008/0019375 | A1 * | 1/2008 | Charzinski et al. | 370/395.21 |
| 2008/0037552 | A1 * | 2/2008 | Dos Remedios et al. | 370/395.21 |

OTHER PUBLICATIONS

Trimintzios, "Engineering the Multi-Service Internet: MPLS and IP-based Techniques", Proceedings of IEEE International Conference on Telecommunications (ICT 2001), Romania, Bucharest, Jun. 4-7, 2001.*

Scoglio, "TEAM: A Traffic Engineering Automated Manager for DiffServ-Based MPLS Networks", IEEE Communications Magazine, Oct. 2004, pp. 134-145.*

Carlos Alberto Kamienski, Djamel Sadok, "Chameleon: An Architecture for Advanced End-to-End Services", Second IEEE Latin American Network Operations and Management Symposium, LANOM S'2001, Aug. 2001.

P. Trimintzios, L. Georgiadis, G. Pavlou, D. Griffin, C.F. Cavalcanti, P. Georgatsos, C. Jacquenet, "Engineering the Multi-Service Internet: MPLS and IP-based Techniques", Proceedings of IEEE International Conference on Telecommunications (ICT 2001), Romania, Bucharest, Jun. 4-7, 2001.

(Continued)

*Primary Examiner*—William Trost, IV
*Assistant Examiner*—Siming Liu
(74) *Attorney, Agent, or Firm*—Philip J. Feig

(57) ABSTRACT

A policy change management scheme for network resource management through dynamic policy adaptations especially suitable for DiffServ-enabled MPLS networks is presented. The scheme incorporates automated resource adaptation capabilities to assure QoS for user traffic and to promote resource utilization in DiffServ-enabled MPLS networks. A suite of resource management policies, an ordered set of methods for adjusting policies, and interfaces to a companion policy-based network management system are provided. The policies are periodically adjusted based on predictive bandwidth estimation algorithms ensuring optimal resource allocation to individual service classes and enabling adjustment of resources for handling current traffic and traffic expected for the near future. Resource allocations to individual service classes are adapted through policy changes when bandwidth utilization deviates from normal level or congestion exists in one or more service classes, allowing corrections to abnormal allocation of resources in incipient phases of congestion.

14 Claims, 5 Drawing Sheets

OTHER PUBLICATIONS

Chen-Nee Chuah, Lakshminarayanan Subramanian, Randy H. Katz, Anthony D. Joseph, "QoS Provisioning Using a Clearing House Architecture", Proceedings of IWQoS 2000, Pittsburgh, PA, Jun. 2000.

Caterina Scoglio, Tricha Anjali, Jaudelice Cavalcante, Ian F. Akyildiz, George Uhl, "TEAM: A Traffic Engineering Automated Manager for DiffServ-Based MPLS Networks", IEEE Communications Magazine, Oct. 2004, pp. 134-145.

International Search Report, dated Aug. 15, 2008 (2 pages).

Anjali T., et al., "A new scheme for traffic estimation and resource allocation for bandwidth brokers," Computer Networks 41, http://www.ece.iit.edu/~tricha/papers/bb.pdf, 2003.

Znati, T., "Node Delay Assignment Strategies to Support End-to-End Delay Requirements in Heterogeneous Networks," IEEE/ACM Transactions on Networking, vol. 12, No. 5, http://netlab.cse.yzu.edu.tw/Research/961/present/11-23-armor.pdf, Oct. 2004.

* cited by examiner

AUTOMATIC POLICY CHANGE MANAGEMENT SCHEME FOR DIFFSERV-ENABLED MPLS NETWORKS

FIELD OF THE INVENTION

This invention relates generally to network resource management through dynamic policy adaptations especially suitable for Differentiated Services (DiffServ)-enabled Multi-Protocol Label Switching (MPLS) networks. In particular, this invention relates to a methodology for estimating network congestion based on network resource usage and automatic policy change management schemes to assure quality of service (QoS) for user traffic.

BACKGROUND OF THE INVENTION

Traditional EP-based networks provide a best-effort transport service that does not offer any service quality guarantees. IP service quality can be supported using the Internet Engineering Task Force's (IETF) DiffServ architecture and MPLS. The DiffServ architecture addresses supporting multiple traffic classes on a per node basis. Since DiffServ mechanisms alone control only per-hop rather than end-to-end performance, MPLS-based traffic engineering (TE) may be used in addition to efficiently distribute traffic along network paths.

Network traffic engineering and configuration tools can be used to support traffic measurement, admission control, and traffic allocation in traffic tunnels and DiffServ-based link scheduling. Network administrators typically have to adjust configurations of these traffic management component mechanisms in order to engineer network traffic such that QoS requirements are met and transported traffic, along with revenues, is maximized. This is an iterative procedure because of continuously changing network status and traffic conditions. To facilitate network management, the above TE components can be integrated in a policy-based architecture where the policies governing aspects of network behavior are pre-defined and stored in a policy repository, and used by the TE components.

In some cases, policies are easily programmed and maintained by the network administrator. Such examples are: a policy rule that assigns 80% of link bandwidth to "Gold" customer traffic between 9 am and 5 pm, and 50% at other times, or a policy rule that sets the bandwidth overbooking factor (or over-subscription ratio) for admission control at 120%. However, the overall policy scheme applied, as well as various specific policy actions, may depend on network dynamics such as network state and traffic conditions.

As a result, the network operator needs to perform dynamic resource allocation responsive to network status changes. However, because of the complexity of the dynamic resource allocation problem, human-driven resource management can result in an inefficient network configuration, due to time overheads and human errors. Automated dynamic resource management alleviates these effects by minimizing human involvement. Moreover, automating resource policy changes can further facilitate resource management by adjusting resource allocation policies in a dynamic fashion based on demand, resource level, and network performance. By using such a system, policy changes can rely on off-line tested algorithms instead of the administrators' best guess, and can avoid over-engineering the network for coping with all status changes. Overall, the automation approach yields a more efficient and economical network resource management.

One approach to automation of resource allocation is found in "*TEAM: A Traffic Engineering Automated Manager for DiffServ-based MPLS Networks*", by Caterina Scoglio, Tricha Anjali, Jaudelice de Oliveira, Leonardo Chen, Ian Akyildiz, George Uhl, & Jeff Smith, *IEEE Communications Magazine*, October 2004, pp. 134-145. This article describes a set of algorithms to provide QoS and better resource utilization in an MPLS network, and further describes an architecture for integration in an automated network manager. The authors recognize the merit of combining the MPLS and DiffServ technologies to provide QoS in IP networks. TEAM encompasses algorithms for MPLS Label Switched Path (LSP) routing, dimensioning, capacity allocation and preemption. However, these algorithms operate in isolation and TEAM lacks an overall high-level scheme that adapts the combined enforcement of the algorithms in accordance with network status. Moreover, TEAM does not include any algorithms for adjusting the DiffServ Ratios (DSR) of network traffic classes, or OverBooking Factor (OBF) for traffic admission.

Another approach to automation of resource allocation is TEQUILA (Traffic Engineering for QUality of service in the Internet at LArge scale) as described in *Engineering the Multi-Service Internet: MPLS and IP-based Techniques*, by P. Trimintzios, L. Georgiadis, G. Pavlou, D. Griffin, C. F. Cavalcanti, P. Georgatsos & C. Jacquenet, *Proceedings of IEEE International Conference on Telecommunications* (ICT 2001), Romania, Bucharest, 4-7 Jun. 2001. This work also addresses traffic management in an MPLS network with DiffServ. A detailed overall policy adaptation scheme with specific methods for MPLS admission control, traffic trunk routing optimization, and dynamic (short-term) route and resource management is presented. In the TEQUILA design, the DiffServ Ratios (DSR) of network classes (DSR policy) are enforced on a per link basis, as opposed to a global policy that is applicable to all links. A problem with TEQUILA's DSR policy is that more frequent DSR policy changes are required, making the system less scalable to the number of traffic trunks and links in the network. Also in TEQUILA, a distinct multi-threshold severity scheme is applied on a per traffic trunk basis. The thresholds, which are the policy parameters corresponding to OBF, have values that are statically assigned by the network administrator, i.e., they are not automatically calculated.

SUMMARY OF THE INVENTION

The present invention provides an inventive solution to network resource management through dynamic policy adaptations especially suitable for DiffServ-enabled MPLS networks. The inventive scheme for Policy Change Management (PCM) incorporates automated resource adaptation capabilities to assure QoS for user traffic and to promote resource utilization in DiffServ-enabled MPLS networks. This invention identifies a suite of resource management policies, an ordered set of methods for adjusting policies, and interfaces to a companion policy-based network management system. The policies are periodically adjusted based on predictive bandwidth estimation algorithms to ensure optimal resource allocation to individual service classes. The predictive algorithm enables adjustment of resources for handling current traffic as well as traffic that is expected for the near future. Accordingly, service providers can improve the quality of their service and their Service Level Agreement (SLA) compliance, by providing a consistently high level of QoS assurance to each and every service class that they manage. Resource allocations to individual service classes are adapted through policy changes when bandwidth utilization deviates from normal level or congestion exists in one or more service classes, allowing corrections to abnormal allocation of resources in incipient phases of congestion. QoS of user traffic within individual service classes is maintained while maximizing utilization across service classes.

The inventive solution comprises a set of bandwidth allocation policies and a method for managing network resources of a DiffServ-enabled MPLS network by dynamically adapting network policies for a network having a plurality of service classes. The method includes the following steps: receiving an alert; if the alert indicates under-utilization of one of the plurality of service classes, examining the performance statistics of the under-utilized service class, and, if bandwidth is low, updating the overbooking policy; if the alert indicates congestion of one of the plurality of service classes and if the bandwidth is available, updating the allocation policy only if it does not violate the ratio policy; if the alert indicates congestion of one of the plurality of service classes and if the bandwidth is not available, determining whether a threshold is met, and, if the threshold is met, updating the ratio policy, and, if the threshold is not met, updating the overbooking policy.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution to the need for a method for managing network resources of a DiffServ-enabled network by dynamically adapting network policies using a policy change management scheme is presented.

This policy change management scheme includes (1) resource management policies for controlling network resources, (2) an overall scheme that jointly controls policy changes in bandwidth allocation, link scheduling, and admission control based on network status feedback events and traffic measurement, (3) a method for adjusting the link bandwidth ratio or DiffServ Bandwidth Ratio (DSR) policy for multiple service classes based on network traffic measurement, and (4) a method for adjusting the Overbooking Factor (OBF) for traffic admission control based on traffic measurement.

Figure 1:
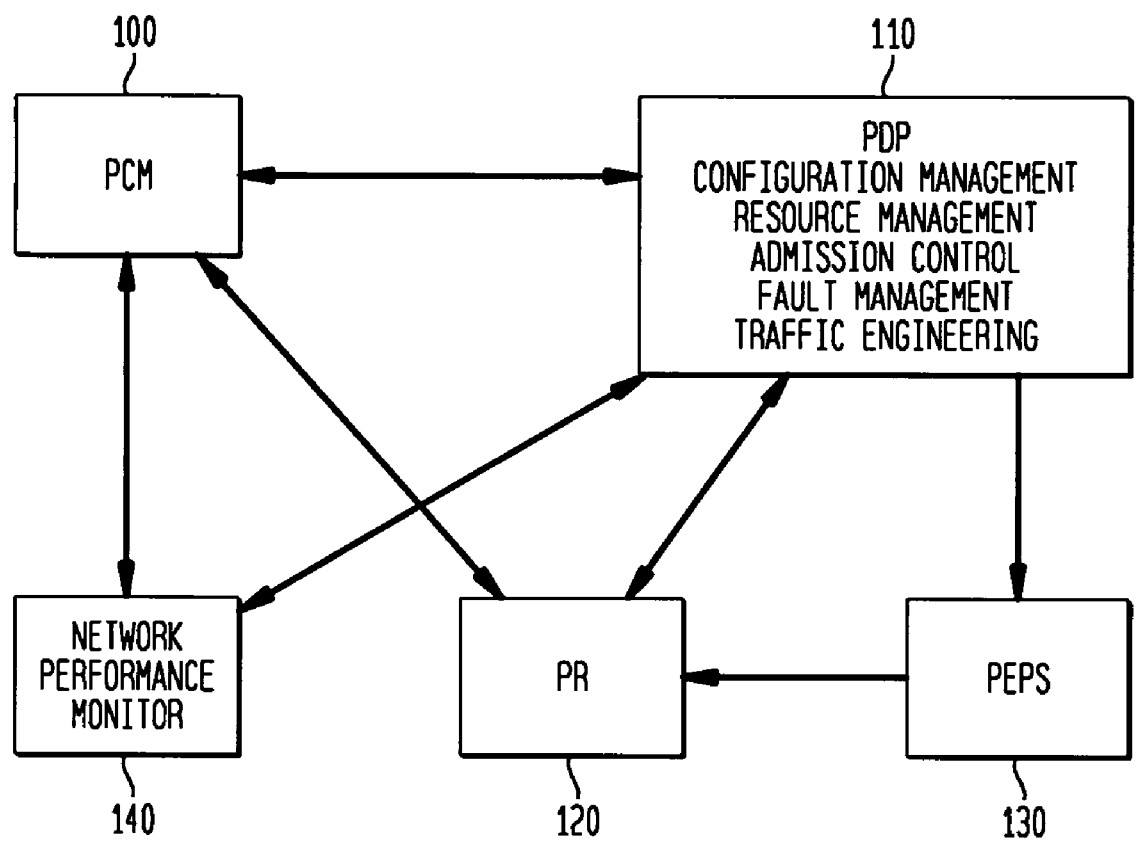
FIG. 1 is a block diagram of a system architecture for policy based resource management including the present invention.

FIG. 1 depicts PCM 100 integrated into a typical system architecture employing Policy Based Resource Management (PBRM). The system consists of external functional components including Policy Decision Point (PDP) 110, Policy Repository (PR) 120, and Policy Enforcement Point (PEP) 130, with optional Network Performance Monitor 140. PDP 110 executes policy decisions, and interacts with PR 120 to retrieve and update policy and network resource information and PEP 130 to enforce the new policies on the network equipment, such as routers. PCM 100 performs as part of PDP 110. PCM 100 determines new network configuration by consulting PR 120; PCM 110 then notifies PDP 110 which can request reconfiguration of the network elements to PEP 130 to enforce the determination of PCM 100. PCM 100 has the capability to interface with these external functional components over a common communication bus architecture (such as Telcordia's Common Bus). However, any common communication bus architecture can be used.

PCM 100 interacts with the system as follows. A network performance monitoring function 140 provides exception alerts and performance statistics to PCM 100. In one embodiment, the network performance monitoring function 140 is performed by the Network Performance Monitor 140; however other functions and devices can be used. After the monitor 140 detects a Traffic Trunk (TT) utilization rate violation on one or more TTs, the monitor notifies PCM 100. The alert carries the violation type and TT information that includes ingress/egress IP addresses, TT ID, and service class. PCM 100 provides the monitor 140 with administrative values for the upper and lower alert utilization thresholds.

In addition, the monitor 140 periodically sends performance statistics such as utilization rates (per DiffServ class) on each link and TT in the network. PCM 100 can provide the monitor with the desired monitoring interval used in statistics collection. The PEP 130 reconfigures network resources based on the new resource allocation scheme, i.e., output, from the PCM 100 via PDP 110. One such output is bandwidth update information on an existing TT, including the TT ID, DiffServ class, and bandwidth amount to be updated. Another output is new TT configuration, including ingress/egress IP addresses, DiffServ class, and bandwidth.

In order to provide QoS assurance and to effectively manage network resources, the PCM 100 scheme has identified three unique policies to perform. Bandwidth Allocation Policy determines the amount of bandwidth to be allocated to individual DiffServ Classes on each TT in the network. Bandwidth of a DiffServ class on a TT can be adjusted within the range that DiffServ Bandwidth Ratio Policy (described below) allows, in response to congestion or bandwidth underutilization. This policy enables service providers to automatically adjust bandwidth of individual TTs when they want to dynamically increase (or decrease) the capacity of TTs based on traffic demand.

DiffServ Bandwidth Ratio Policy determines the relative, maximum amount of bandwidth that can be assigned to individual DiffServ classes on each link (i.e., interface). Adjusting the ratio affects the maximum amount of bandwidth that a service class is assigned on each link, so that the performance of congested DiffServ classes can be controlled. This policy promotes strategic sharing of link bandwidth among DiffServ classes by limiting the allocation of bandwidth to each DiffServ class according to service provider's traffic engineering, resource management, and profit models.

Traffic Overbooking Policy determines the degree of traffic multiplexing in individual DiffServ classes on TTs between two edge locations of a service provider network. Increasing the overbooking value allows more traffic to be admitted under the same amount of available bandwidth, and vice versa. This policy can effectively compensate for potential inaccuracies of resource allocation schemes in admission control mechanisms by adapting admission rate to currently available resource level, based on actual measurements of bandwidth utilization on TTs between two edge locations in the network. For example, when requests are arriving from flows of the same type, each requesting 10 bandwidth units but actually using only 9 units, only the first 10 flows can be admitted on a TT with 100 actual bandwidth units. In this case, the aggregated traffic-uses only 90 units, but admission control cannot admit additional flows even though there is room for an additional flow that can fit to the 10 idling units. With an overbooking value of 1.1, the initial total available bandwidth is 110 units (100*1.1), allowing the acceptance of 11 flows instead of only 10 flows. This policy improves resource utilization in the presence of high traffic demand and maintains QoS of customer traffic. In addition, this policy can be used to control performance of customer traffic by controlling the degree of congestion in a DiffServ class on TTs between two edges as well as resource utilization rate when DiffServ classes are in high demand.

Figure 2:
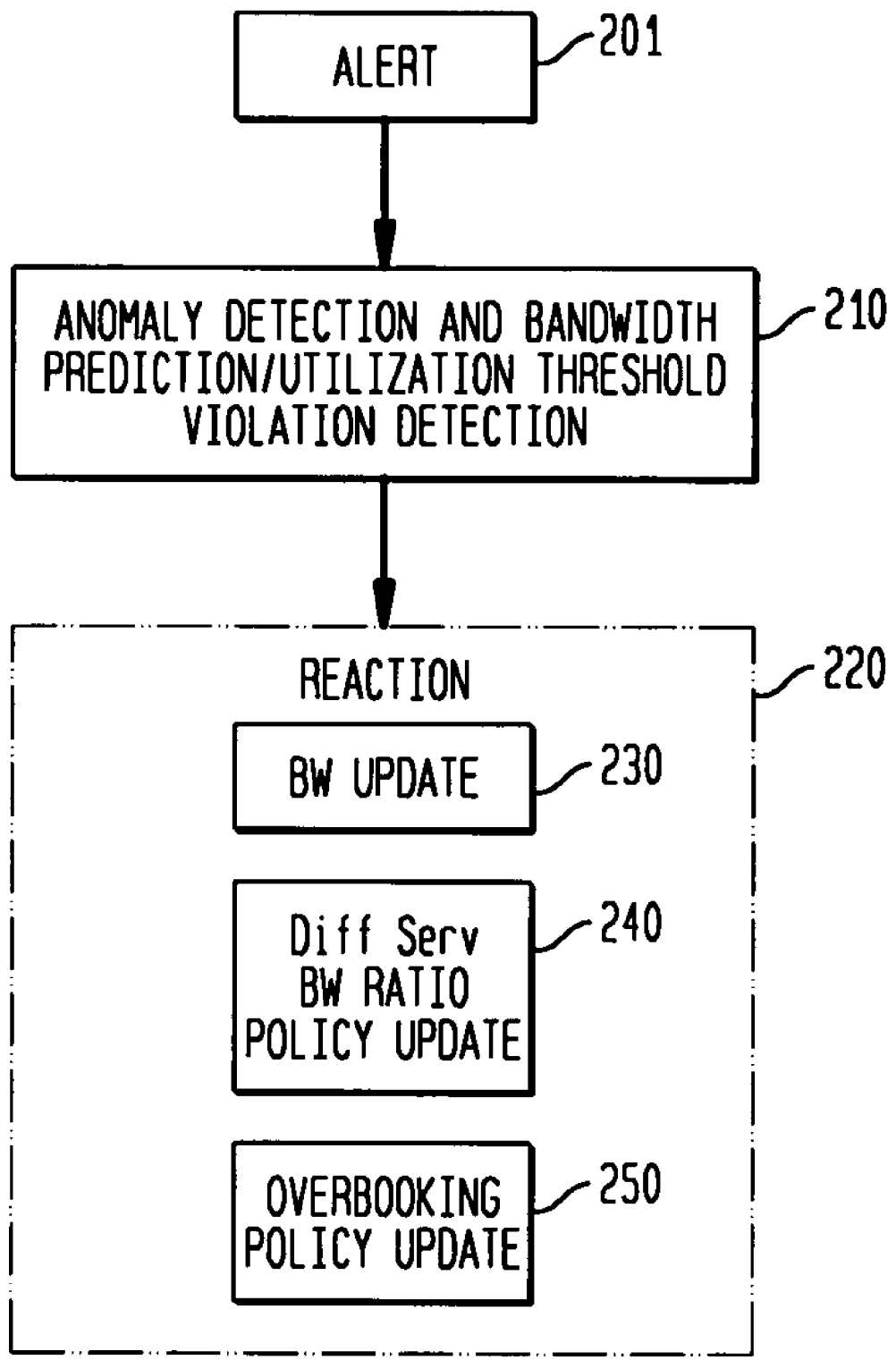
FIG. 2 is a block diagram of an exemplary embodiment of the present invention.

FIG. 2 shows two top level procedures or functions for policy management by PCM 100. When an alert 201 is issued by the monitor 140, as described above, the Anomaly Detection and Bandwidth Prediction 210 function is initiated. This function, which includes Utilization Threshold Violation Detection, is responsible for determining whether congestion or underutilization has occurred in the region of the network indicated by an alert 201. Based on the determination, the function next determines if the current resource allocation scheme has to be updated to eliminate congestion, or if policies that cause resource underutilization need to be adjusted. The Anomaly Detection and Bandwidth Prediction 210 function is also responsible for accurately forecasting near future bandwidth demand on the congested DiffServ class so that congestion or underutilization does not occur in the near future.

The Reaction function 220 is invoked by the Anomaly Detection and Bandwidth Prediction 210 function when the current resource allocation scheme needs to be updated, or policies need to be adjusted. Reaction 220 includes three separate operations: BW Update 230, DSR Policy Update 240, and Overbooking Policy Update 250. The BW Update function 230 computes a new bandwidth allocation scheme when congestion is detected in a service class. The DSR Policy Update function 240 checks if the current DSR has caused widespread bandwidth shortages in some classes in multiple regions in the network. If it has, DSR Policy Update 240 computes a new bandwidth ratio and updates the DSR Policy. If no widespread bandwidth shortages have occurred, DSR Policy Update 240 invokes the Overbooking Policy Update function 250.

The Overbooking Policy Update function 250 computes a new traffic multiplexing level to compensate for the inaccuracies of the amount of bandwidth allocated to admitted flows in a DiffServ class on TTs between two network edges. When congestion exists, Overbooking Policy Update function 250 reduces the overbooking value to reduce the total traffic amount admitted. When underutilization is detected, Overbooking Policy Update function 250 increases the overbooking value if doing so can improve the utilization.

Details of the operation of these two top level functions are as follows. The Anomaly Detection and Bandwidth Prediction 210 or Utilization Threshold Violation Detection function operates by receiving an alert from network monitor, and determines whether a reaction is required. A reaction is required under the following two conditions: when the alert notifies a high utilization violation and congestion is detected in the section of the network indicated by the alert, and when the alert notifies a low utilization violation and the level of available bandwidth is low.

Figure 3:
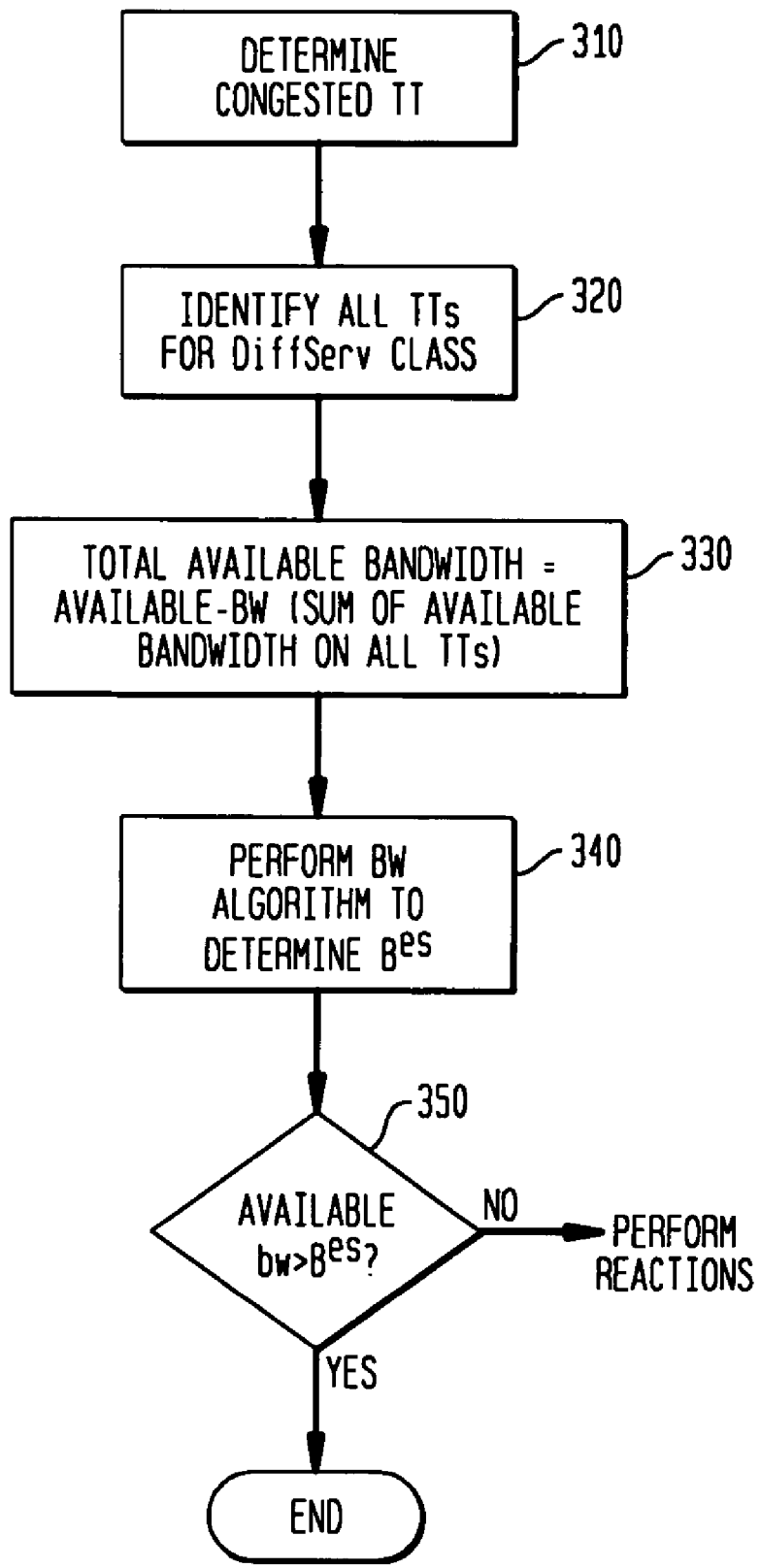
FIG. 3 is a flow diagram of one operation of the present invention.

If the alert notifies a high utilization violation, PCM 100 determines whether congestion actually exists at the section of the network indicated by the alert. PCM 100 uses a Bandwidth Estimation (BE) algorithm (described below) to determine how much additional bandwidth is required for the congested service class on the ingress/egress. Note that the BW algorithm (i.e., Gaussian Estimator) mentioned in this document is not a part of this invention. The process flow, shown in FIG. 3, is as follows. Determine 310 the congested TT id, type of service for the TT, DiffServ class, and the ingress and egress IP addresses on which the TT is incident. Identify 320 all the TTs for the DiffServ class incident on the ingress/egress. For the TTs, sum up 330 the total available (i.e., unused) bandwidth for each TT for the DiffServ class, and let the total available bandwidth be available-bw.

Using BE algorithm, calculate 340 the new bandwidth requirement. The algorithm computes the bandwidth amount, $B^{es}$, that is expected to be required by users in the near time epoch. The input to the algorithm is the mean (m) and variance ($\sigma$) of the total amount of traffic (from flows or pipes) for the DiffServ class on the ingress/egress, measured during recent monitoring intervals. Based on the $B^{es}$, it is straightforward to calculate an estimate of additional bandwidth $\delta$ required for that service class to avoid congestion. The BE algorithm along with details on computing $B^{es}$ are described in more detail below.

Next, compare 350 the two values, available-bw and $\delta$. If available-bw is larger, PCM 100 operation terminates for the current alert. Otherwise, PCM 100 operation continues and performs the Reaction function to upgrade bandwidth.

However, if the alert indicates a low utilization violation and the level of available bandwidth is low, PCM 100 determines whether the low utilization is caused by inappropriate settings of the Overbooking Policy. PCM 100 determines if the overbooking factor needs to be increased by examining current available bandwidth information and other performance statistics such as packet loss rates and queuing delays for the DiffServ class. If available bandwidth is very small, then bandwidth is over-provisioned. To adjust for this situation, the Overbooking Policy must be updated so that the overbooking factor can be increased. If the overbooking factor needs to be updated, PCM 100 operation continues and performs the Reaction function to upgrade the Overbooking Policy. Otherwise, PCM 100 operation terminates for the current alert.

Figure 4:
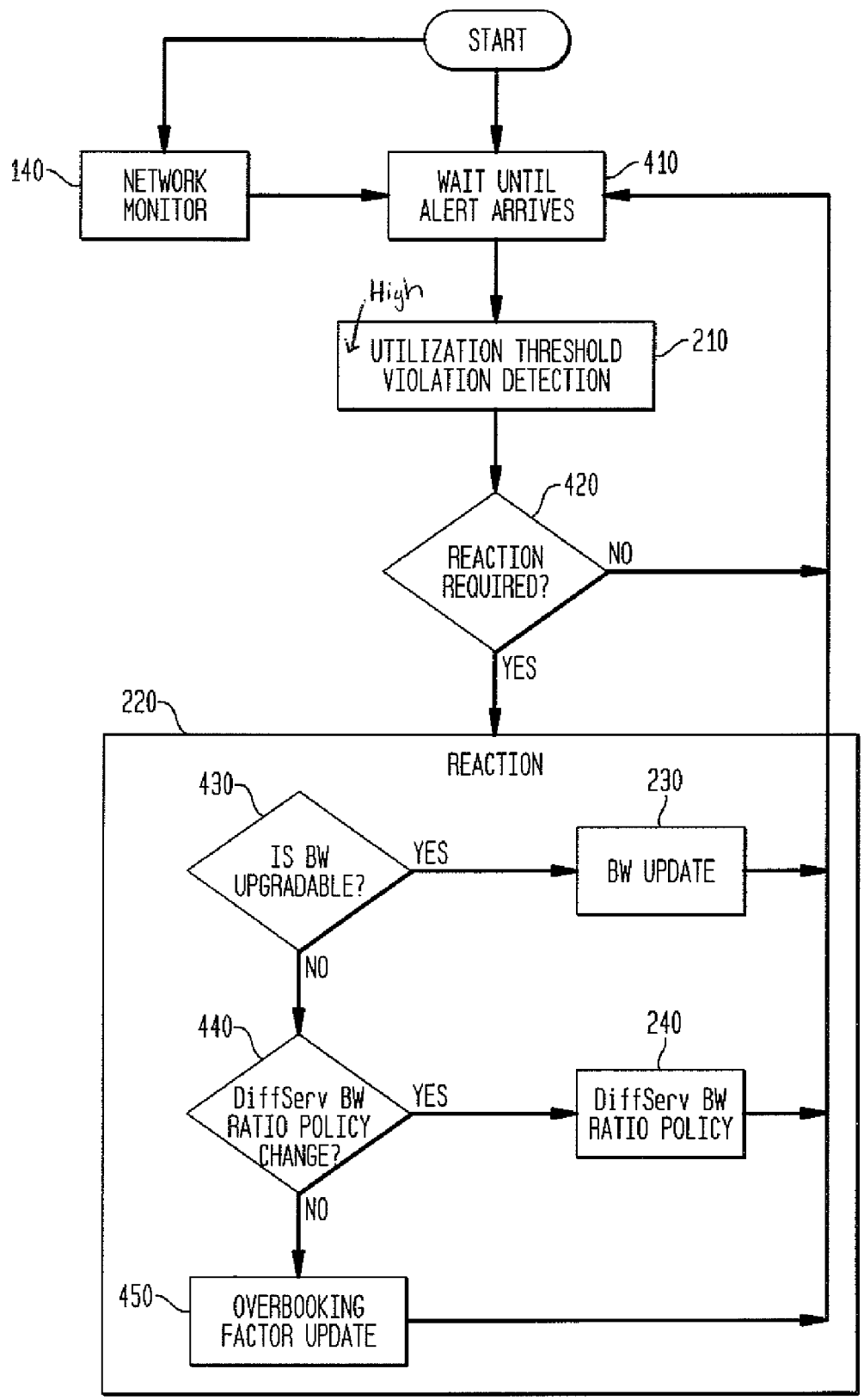
FIG. 4 is a flow diagram of another operation of the present invention.
Figure 5:
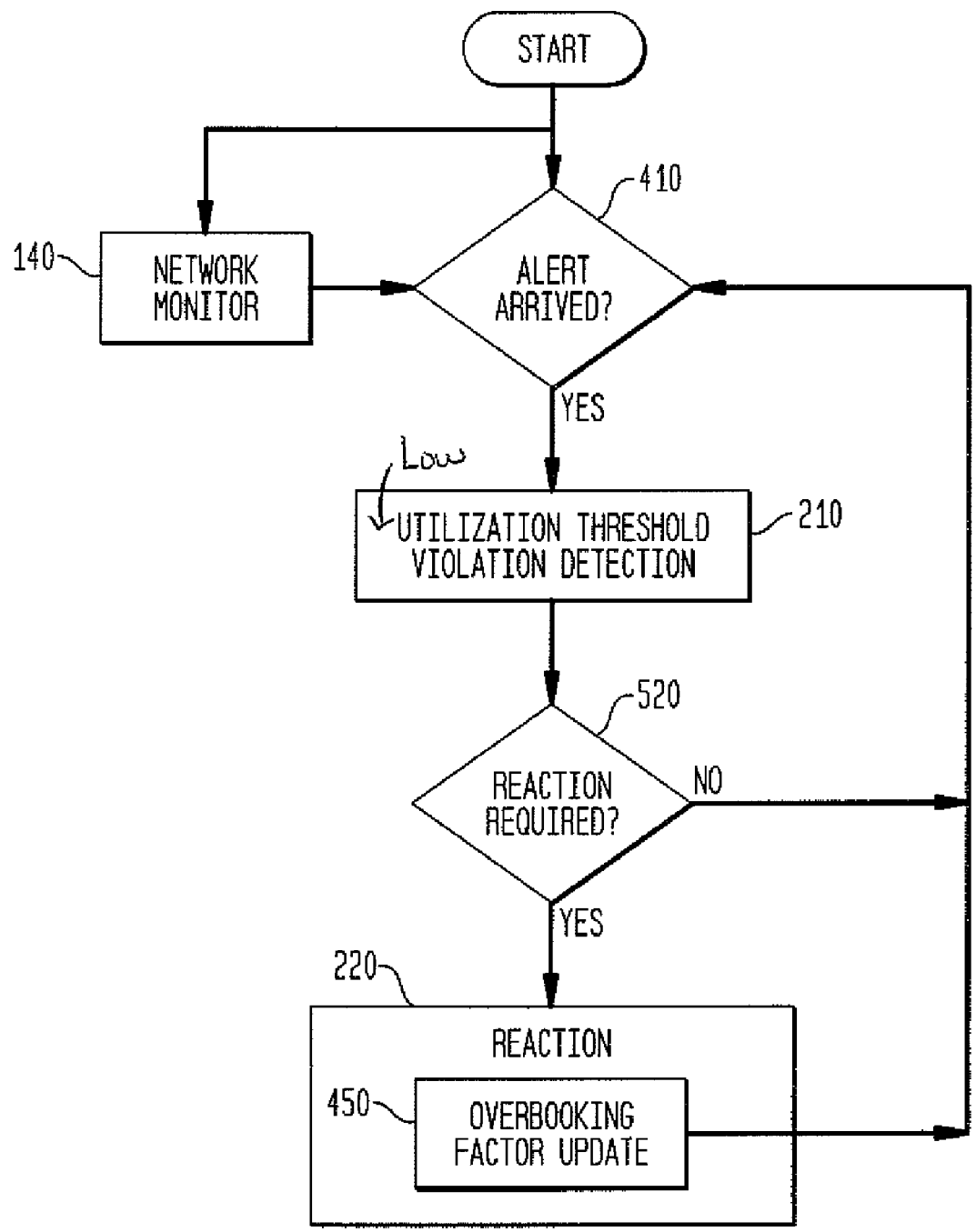
FIG. 5 is a block diagram of another of the present invention.

A detailed description of the operation of the second top level function, Reaction, is now presented and shown in FIGS. 4 and 5. As discussed above, the Network Monitor 140 forwards alerts to PCM 100. When an alert arrives (410=YES), the Utilization Threshold Violation Detection function 210 is executed as discussed above. If a reaction is required (420=YES), the Reaction function 220 is executed for both low utilization violations (FIG. 5) and high utilization violations (FIG. 4). FIG. 4 shows the operation performed if the alert indicates a high utilization violation. In response to high utilization violations, at least one of three functions, BW Update 230, DiffServ BW Ratio Policy Change 240, and Overbooking Factor Update 450, is performed.

Initially, the Reaction function 220 determines whether the bandwidth is upgradeable 430. This is determined as follows. The first five Boolean expressions defined in Table-1 are evaluated one at a time in the order shown in the table until the expression evaluates to true. Condition codes a through f used in the table are defined as follows:

a: Enough link BW exists for the same DiffServ class on all interfaces on same path.

b: Enough link BW exists for the same DiffServ class on other existing TT(s).

c: Enough link BW exists for another DiffServ class on the same path.

d: Enough link BW exists for other DiffServ classes on other existing TT(s).

e: There is a path between the two edges with links that have enough available link BW.

f: Counters for DiffServ BW Ratio Update requests have reached the threshold values.

If the condition evaluates to true, the corresponding operation is performed. As shown in the table, there are five different types of BW Upgrade operations (Operations 1.1-1.5). The five Boolean expressions are ordered to enable high network resource utilization when demand gets high.

the DiffServ BW Ratio Policy is global, it should not be updated unless the need for policy update has been present ubiquitously.

To effectively manage the updating of the DiffServ BW Ratio Policy, PCM 100 maintains two state variables, frequencyCount and areaCount, to keep the number of DiffServ BW Ratio Policy update events and the location (i.e., ingress/egress pair) count where DiffServ policy update was considered since the last DiffServ BW Ratio Policy update. PCM 100 also keeps two tunable threshold values thresholdFrequency and thresholdArea to compare against the two state variables. With the two state variables and threshold values, PCM 100 performs the following operations to determine whether the DiffServ BW Ratio Policy can be updated.

1. Increment frequencyCount by 1;
  2. Increment areaCount by 1 if the ingress/egress does not match to the ones in the locationList;
  3. If frequencyCount>=thresholdFrequency) and (areaCount>=thresholdArea) then

TABLE 1

| Operations/Functions | Conditions | | | | | | Action to be taken | Parameters to be used for Actions |
|---|---|---|---|---|---|---|---|---|
| | a | b | c | D | e | f | | |
| BW Upgrade | T | | | | | | Operation 1.1: Upgrade BW on same TT path in same DiffServ class | TTid, DiffServClass, $B^{es}$ |
| | F | T | | | | | Operation 1.2: Upgrade BW on other existing TT(s) in the same DiffServ class | TTid, ingressIPaddr, egressIPaddr, DiffServClass, $B^{es}$ |
| | F | F | T | | | | Operation 1.3: Borrow BW from other DiffServ class on the same path | TTid, DiffServClass, $B^{es}$ |
| | F | F | F | T | | | Operation 1.4: Borrow BW from other DiffServ class on other existing TT | TTid, ingressIPaddr, egressIPaddr, DiffServClass, $B^{es}$ |
| | F | F | F | F | T | | Operation 1.5 Upgrade BW by creating a new TT | TypeOfService, ingressIPaddr, egressIPaddr, DiffServClass, $B^{es}$ |
| DiffServ BW Ratio Policy Change | F | F | F | F | F | T | | $B^{es}$ |
| Overbooking Factor Update | F | F | F | F | F | F | | DiffServClass, $B^{es}$ |

If the BW is upgradeable (430=YES), then the link bandwidth availability is checked against the DiffServ BW Ratio Policy (discussed above) to verify that the new bandwidth allocation does not violate current DiffServ BW Ratio Policy. If the policy is not violated, the BW Update function 230 is performed. PCM 100 can perform bandwidth borrow operations by simply updating total and available bandwidth information on TTs by policy-related (PR) transactions. Upon completion of this function, PCM 100 checks for a new alert.

If the BW is not upgradeable (430=NO), or the DiffServ BW Ratio Policy would be violated, the Reaction function determines whether the DiffServ BW Ratio Policy could be changed (440). Thus, DiffServ BW Ratio Policy Update can be performed when BW upgrade operation is not possible, that is, when the first five Boolean expressions in Table-1 evaluate to false and the sixth expression ($\wedge a \bar{\,} \wedge b \bar{\,} \wedge c \bar{\,} \wedge d \bar{\,} \wedge e \wedge f$) is evaluated to be true, where a, b, c, d, and e are defined above in the table.

At this point, the Reaction function determines whether the DiffServ BW Ratio Policy can be changed by checking whether the need for policy change has been accumulated for enough time over multiple edge pairs in the network. Since Compute the new BW ratio for DiffServ classes (PCM uses the BE algorithm for all DiffServ classes to find the right ratio);

Generate a DiffServ BW Ratio Policy change request;

Reset frequencyCount, areaCount, and empty the locationList;

4. Else

Add the ingress/egress pair in the locationList if it does not already exist in the list, and proceed to Overbooking Policy Update (described below) to decrease the overbooking factor.

As these operations illustrate, if the DiffServ BW Ratio Policy cannot be changed (440=NO), then the Reaction function executes the Overbooking Factor Update function 450.

As discussed above, when the last Boolean expression in Table-1 is evaluated to be true, the Reaction function executes the Overbooking Factor Update function 450 to decrease the overbooking factor and update the Overbooking Policy. The Overbooking Factor Update function initially computes a new overbooking factor, using the overbooking factor computation algorithm discussed below. Next, the overbooking factor value and available bandwidth information for the appropriate DiffServ class is updated accordingly. Thus, the operation is completed for the current alert, and PCM 100 checks for a new alert.

FIG. 5 shows the operations performed if the alert indicates a low utilization violation. When an alert arrives (410=YES), the Utilization Threshold Violation Detection function 210 is executed as discussed above. If a reaction is required (520=YES), the Reaction function 220 is executed. In response to the low utilization violations, the Overbooking Factor Update function 450 (described above) is performed. After increasing the overbooking factor and updating the available bandwidth information for the service class, operation is completed for the current alert, and PCM 100 checks for a new alert.

Next, the algorithms or processing functions used by PCM 100 are described in detail.

The objective of Bandwidth Estimation (BE) algorithm is to support control of bandwidth utilization on a traffic flow aggregate to avoid congestion and underutilization. The aggregate may be an LSP, a service class in an LSP, and so forth. More precisely, the objective of BE is to assist in keeping the utilization value of a traffic aggregate within an upper and lower bound, around some desired level, e.g., (70+/−10) %.

The control of utilization directly keeps the traffic aggregate bandwidth values within an operating region. It indirectly allows for more fine-grained admission control and DiffServ mechanisms to preserve QoS requirements.

The BE algorithm uses as input the combination of monitoring alerts and monitoring performance statistics or log data. Alerts in this case are notifications of utilization threshold violations. Log data include periodically averaged bandwidth utilization measurements of the aggregate in question. A correction factor can also be input, to control the estimate. The BE algorithm outputs estimated bandwidth, $B^{es}$.

In order to allow scalable deployment, BE for an aggregate is invoked on a proactive demand-driven basis. That means utilization thresholds are assumed to be set to a relatively small region around the target value so that bandwidth updates based on the algorithm have a proactive effect, i.e., alerts are raised before congestion or underutilization occur.

Whenever the PCM 100 receives a utilization notification, the BE estimation algorithm is triggered. The algorithm pulls log data of the aggregate including average utilization samples within a measurement window $T_m$. The mean m and variance σ of the samples are used to estimate the current bandwidth requirement $B^{es}$ of the aggregate using the following formula:

$$B^{es} = m + \alpha\sigma,$$

where α is a correction factor that controls how conservative this estimate is.

The BE estimation formula used is based on the assumption that the distribution of the bandwidth of the sum of the aggregated flows is Gaussian (Central Limit Theorem). $B^{es}$ is interpreted as the estimated value that ensures the bandwidth requirement with a probability controlled by α. Additionally, to account for modeling approximation errors, the correction factor α may be adjusted to provide more accurate estimates. PCM 100 does not require usage of the Gaussian estimator specifically, but it is included for completeness. Bandwidth prediction algorithms that are based on other theories and ideas can also be used.

The DiffServ BW Ratio Computation Algorithm is described next. As discussed above, the objective of updating global DiffServ Bandwidth Ratio (DBR) is to align the actual traffic demand of each class to the currently configured allocation. Doing so on a frequent basis would reduce other bandwidth management operations. On the other side, frequently updating the configured DBR bandwidth across all links of the network, that is, implementing a global policy, may cause instabilities and a configuration management burden. Accordingly, PCM 100 follows a more conservative approach.

The DBR computation algorithm is based on the concept of the link DiffServ Utilization Matrix (DUI). An element of the matrix, $\mu_{ij}$, corresponds to the utilization of service class i on link j (each j may have different link bandwidth). The idea of the algorithm is to find a network wide DBR that is in some sense the closest to the utilization columns of the matrix, where each column corresponds to the current per class utilization on a link. This is formulated as an optimization problem that minimizes the distance from the new DBR vector to all column vectors of the DUI under the constraint that the sum of the service class allocations are bounded by the total link bandwidth. Standard optimization algorithms can be used to solve this problem.

The update of the DBR policy is based on the formulation of an optimization problem under the assumption that this is a global policy, i.e., DSR is enforced uniformly on all links across the network. Accordingly, the algorithm is only invoked using a multi-event criterion rather than in response to sparse local anomalous events. Although this is a global policy, it is possible that different DSR allocations exist locally based on intra-class bandwidth borrowing, which is supported on an ingress-egress path. The optimization in this section is therefore a long-term DiffServ policy change management which avoids instabilities that might be caused by algorithms that try to control the DSR based on instantaneous circumstances.

The optimization algorithm is based on calculating the vector that is closest to current network traffic conditions. Let (x1,x2, . . . , xN) be the DBR ratio, and let (a1,a2, . . . , aN) be the projected class maximum utilization vector, where N is the number of supported QoS classes and $a_i$ is the projected utilization of class i, maximized over all links in the network. The following problem is solved:

Minimize $f(x_1, \ldots, x_N) = \Sigma^N (x_i - a_i)^2$ subject to $\Sigma x_i <= 100$, and, $x_1, x_2, \ldots, x_N >= 0$.

Also, by the nature of the problem at hand, $a_1, a_2, \ldots, a_N > 0$.

This is a constrained quadratic optimization problem formulation for the stated objective and can be generally solved using the Kuhn-Tucker optimization method. For example, for a network with three DiffServ classes on each link (i.e., N=3), we can consider the 3 dimensional case, where $a_1$=a, $a_2$=b, $a_3$=c and $x_1$=x, $x_2$=y, $x_3$=z.

1) a+b+c<=100
solution is x=a, y=b, z=c.
2) a+b+c>100, and
a+b−2c<=100
a+c−2b<=100
b+c−2a<=100
solution is, define d=(a+b+c−100)/3
then x=a−d, y=b−d, z=c−d.
3) a+b−2c>100, and
a−b<=100
b−a<=100
solution is, define d=(a+b−100)/2
then x=a−d, y=b−d, z=0.
4) a+c−2b>100, and
a−c<=100
c−a<=100
solution is, define d=(a+c−100)/2
then x=a−d, y=0, z=c−d.

5) b+c−2a>100, and
b−c<=100
c−b<=100
solution is, define d=(b+c−100)/2
then x=0, y=b−d, z=c−d.
6) a−b>100 and
a−c>100
solution is x=100, y=0, z=0.
7) b−a>100 and
b−c>100
solution is x=0, y=100, z=0.
8) c−a>100 and
c−b>100
solution is x=0, y=0, z=100.

Next, the Overbooking Factor Computation Algorithm is described.

The objective of updating the overbooking factor of a service class on an ingress-egress pair is to control the utilization of that service class on that ingress-egress pair. A simple scheme is used to adjust the overbooking factor based on the expected demand as predicted by the BE algorithm (described above).

The overbooking factor is defined as the fraction of the available bandwidth (based on book-keeping) that PCM 100 allows to be allocated by newly admitted flows. Ideally, by using book-keeping, the bandwidth assigned by admission control to each existing flow in the system is optimum. However, the book-keeping based bandwidth may underestimate or overestimate the actual bandwidth that is available for new flows. For that reason, whenever there is a underutilization or over-utilization notification, the overbooking factor is used as a policy parameter by PCM 100 to adapt admission control to current traffic conditions. So, by definition we have for the overbooking factor, $O_F$:

$$O_F = B^L/B^A, \quad (1)$$

where, $B^L$ is the bandwidth allowed by PCM 100, and $B^A$ is the available bandwidth as calculated by book-keeping.

In case of low utilization, the Overbooking Factor Computation Algorithm uses an estimate of used bandwidth $B^E$ of an ingress-egress. Therefore, the bandwidth estimated to be available in the next epoch, before another estimation is invoked, is given by:

$$B^L = T - B^E, \quad (2)$$

where T is the total bandwidth of traffic trunks along the ingress-egress path in question.

From (1) and (2) above, a new overbooking factor is derived using the formula:

$$O_F = (T - B^E)/B^A$$

By using the above formula for $O_F$, it is evident that as new flows arrive their traffic is allowed to eventually occupy the available bandwidth estimated based on real measurements. In the case that utilization is higher than an administratively set threshold $B_H$, a high utilization notification is issued to the PCM 100.

While the present invention has been described in particular embodiments, it should be appreciated that the present invention should not be construed as limited by such embodiments, but rather construed according to the below claims.

What is claimed is:

1. A method for managing network resources of a DiffServ-enabled MPLS network by dynamically adapting network policies, said network having a plurality of service classes and Traffic Trunks (TT) and being capable of providing alerts and performance statistics for each of the plurality of service classes and for each of the TTs, said method comprising:
identifying a bandwidth allocation policy that determines the amount of bandwidth to be allocated to individual TTs in the network, a ratio policy that determines the relative, maximum amount of bandwidth that can be assigned to individual DiffServ classes on each link, and an overbooking policy that determines the degree of traffic multiplexing in individual DiffServ classes on TTs between two edge locations of a service provider network;
generating an alert by a network performance monitor when a TT utilization rate violation is detected;
if the alert indicates under-utilization of a TT in one of the plurality of service classes, examining the performance statistics of the under-utilized service class, and, if the available link bandwidth of the service class along the TT path is lower than a predetermined low threshold value, updating the overbooking policy;
if the alert indicates high utilization of a TT in one of the plurality of service classes and if there is available link bandwidth between the ingress and egress of the TT, updating the bandwidth allocation policy only if it does not violate the ratio policy;
if the alert indicates high utilization of a TT in one of the plurality of service classes and if there is not sufficient available link bandwidth, determining whether current DiffServ ratio policy corresponds to the actual traffic demands for each service class in the network, and if current DiffServ ratio policy corresponds to the actual traffic demands for each service class in the network, updating the ratio policy, otherwise updating the overbooking policy.

2. The method according to claim 1, further comprising forecasting near-future-bandwidth and calculating a total available bandwidth for the congested one of the service classes, and if the calculated total available bandwidth is less than the near-future-bandwidth, updating one of the bandwidth allocation policy, the ratio policy and the overbooking policy.

3. The method according to claim 2, wherein the total available bandwidth is calculated by summing available bandwidth for each Traffic Trunk (TT) of the congested service class.

4. The method according to claim 1, wherein updating the overbooking policy comprises an overbooking factor.

5. The method according to claim 1, wherein forecasting near-future-bandwidth is done using a Gaussian predictor.

6. The method according to claim 1, wherein the ratio policy comprises a DiffServ BW ratio to align the actual traffic demand of each class to the currently configured allocation.

7. The method according to claim 6, wherein the DiffServ BW ratio is calculated using a Kuhn-Tucker optimization method.

8. A non-transitory computer readable medium having computer readable program code for operating on a computer for managing network resources of a DiffServ-enabled MPLS network by dynamically adapting network policies, said network having a plurality of service classes and a network performance monitoring function capable of providing an alert, and performance statistics for each of the plurality of service classes, comprising:
identifying a bandwidth allocation policy that determines the amount of bandwidth to be allocated to individual TTs in the network, a ratio policy that determines the relative, maximum amount of bandwidth that can be assigned to individual DiffServ classes on each link, and an overbooking policy that determines the degree of traffic multiplexing in individual DiffServ classes on TTs between two edge locations of a service provider network;

receiving the alert;

forecasting near-future-bandwidth;

if the alert indicates under-utilization of a TT in one of the plurality of service classes, examining the performance statistics of the under-utilized service class, and, if the available link bandwidth of the service class among the TT path is lower than a predetermined low threshold value, updating the overbooking policy;

if the alert indicates high utilization of a TT in one of the plurality of service classes and if there is available link bandwidth between the ingress and egress of the TT, updating the allocation policy;

if the alert indicates high utilization of a TT in one of the plurality of service classes and if there is not sufficient available link bandwidth, determining whether current DiffServ ratio policy corresponds to the actual traffic demands for each service class in the network, and if current DiffServ ratio policy corresponds to the actual traffic demands for each service class in the network, updating the ratio policy, otherwise updating the overbooking policy, wherein the allocation policy is updated only if it does not violate the ratio policy.

9. The computer readable program code according to claim 8, further comprising calculating a total available bandwidth for the congested one of the service classes, and if the calculated total available bandwidth is less than the near-future-bandwidth, updating one of the allocation policy, the ratio policy and the overbooking policy.

10. The computer readable program code according to claim 9, wherein the total available bandwidth is calculated by summing available bandwidth for each Trunk Traffic (TT) of the congested service class.

11. The computer readable program code according to claim 8, wherein updating the overbooking policy comprises an overbooking factor.

12. The computer readable program code according to claim 8, wherein forecasting near-future-bandwidth is done using a Gaussian predictor.

13. The computer readable program code according to claim 8, wherein the ratio policy comprises a DiffServ BW ratio to align the actual traffic demand of each class to the currently configured allocation.

14. The computer readable program code according to claim 13, wherein the DiffServ BW ratio is calculated using a Kuhn-Tucker optimization method.

* * * * *

UNITED STATES PATENT AND TRADEMARK OFFICE
CERTIFICATE OF CORRECTION

| | | |
|---|---|---|
| PATENT NO. | : 7,760,643 B2 | Page 1 of 2 |
| APPLICATION NO. | : 11/784649 | |
| DATED | : July 20, 2010 | |
| INVENTOR(S) | : Kim et al. | |

It is certified that error appears in the above-identified patent and that said Letters Patent is hereby corrected as shown below:

On the title page, in Figure, delete "  " andqeee insert --  --, therefor.

In the Drawings

In Fig. 4, Sheet 4 of 5, delete "  " and insert --  --, therefor.

In Fig 5, Sheet 5 of 5, delete "  " and insert --  --, therefor.

Signed and Sealed this
Sixth Day of January, 2015

Michelle K. Lee
*Deputy Director of the United States Patent and Trademark Office*

CERTIFICATE OF CORRECTION (continued)
U.S. Pat. No. 7,760,643 B2

In the Specification

In Column 1, Line 18, delete "EP-based" and insert -- IP-based --, therefor.

In Column 3, Line 43, delete "invention." and insert -- invention; --, therefor.

In Column 7, in Table 1, Under "Conditions" delete "D" and insert -- d --, therefor.